July 21, 1942.    T. BACKUS    2,290,821
TRANSMISSION
Filed Aug. 28, 1941
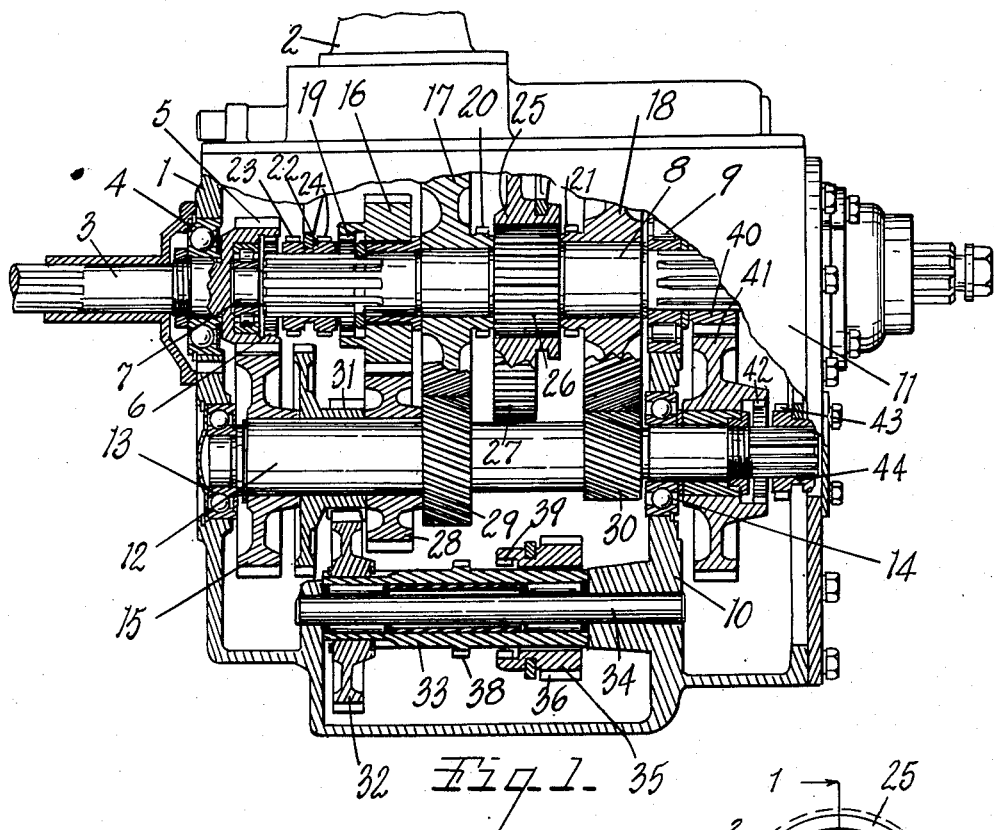
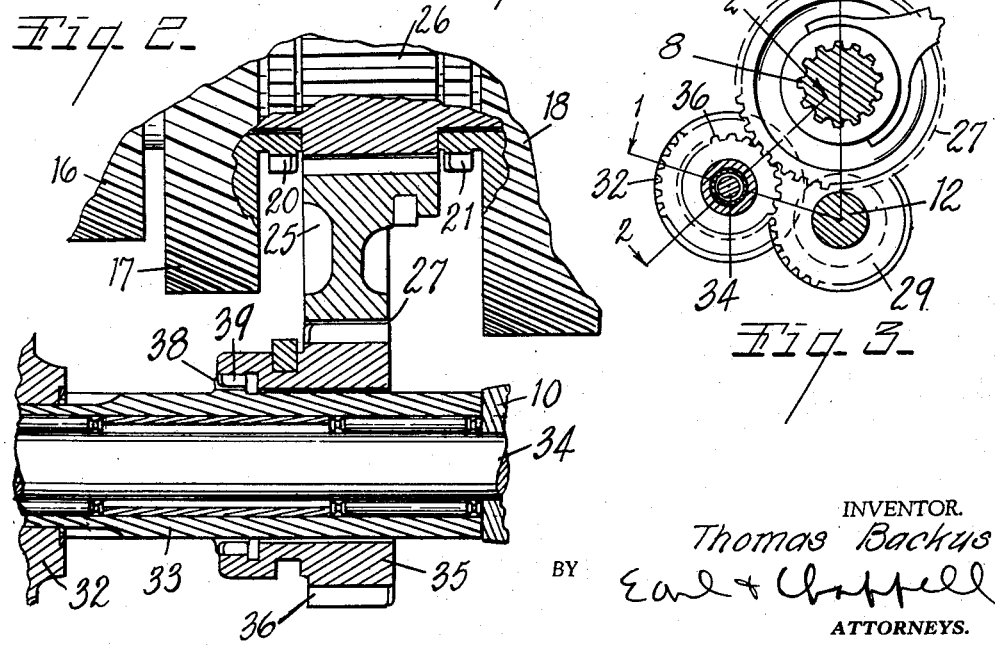
INVENTOR.
Thomas Backus
BY Earl & Chappell
ATTORNEYS.

Patented July 21, 1942

2,290,821

UNITED STATES PATENT OFFICE 2,290,821

TRANSMISSION

Thomas Backus, Kalamazoo, Mich., assignor to Fuller Manufacturing Company, Kalamazoo, Mich.

Application August 28, 1941, Serial No. 408,589

8 Claims. (Cl. 74—333)

This invention relates to improvements in transmissions.

This invention relates to change-speed transmissions. It has for its objects:

First, to provide a new and improved change-speed transmission.

Second, to provide such a transsmission in which all of the forward speeds are constant mesh and in which a suitable reversing gearing is provided without increasing the length of the transmission.

Third, to provide such a transmission with reverse gearing which is independent of the forward speed gearing insofar as gear ratios are concerned, and in which the shifting from neutral to reverse is accomplished with a minimum of movement.

Other objects and advantages pertaining to details and economies of construction and operation will appear from the description to follow. The invention is defined in the claims. A preferred embodiment of my invention is illustrated in the accompanying drawing, in which:

Fig. 1 is a detail sectional view of a transmission embodying my invention, taken on the line 1—1 of Fig. 3.

Fig. 2 is a partial sectional view taken on line 2—2 of Fig. 3, showing the reverse idler shifted into position for reversing.

Fig. 3 is an end view of the various shafts and gearing employed in the transmission.

The transmission consists of a casing 1 provided with the usual gear shifting tower 2. The input shaft 3 is mounted in a suitable bearing 4 in the front of the casing and is provided with an integral gear 5 having internal clutch teeth 6. The end of the input shaft 3 is bored at 7 to provide an end bearing for a main shaft 8 which is supported further by a bearing 9 in a partition 10 in the casing. Further bearing means are provided at 11 for the rear end of the main shaft 8. A countershaft 12 mounted in bearings 13 and 14 extends parallel with the main shaft 8. A gear 5 is fixed to the shaft in mesh with the gear 5. On the main shaft 8, I provide bushed gears 16, 17 and 18 provided respectively with clutch teeth 19, 20 and 21. A shifter 22 is splined to the shaft 8 and provided with clutch teeth 23 and 24 to respectively engage the clutch teeth 6 and 19. A shifter 25 is splined to the shaft between the gears 17 and 18, and is provided with clutch teeth 26 to selectively engage the clutch teeth 20 or 21. On the shifter 25 I provide reverse gear teeth 27.

Fixed to the countershaft 12 are gears 28, 29 and 30 to engage respectively gears 16, 17 and 18 in a conventional manner to provide a constant mesh transmission which is controlled by the shifters 22 and 25.

Opposite the shifter 22, I provide a driving gear 31 fixed to the countershift 12. This gear is in constant mesh with a gear 32 fixed to a sleeve 33 mounted for rotation on the reverse idler shaft 34. Opposite the shifter 25, I provide a reverse idler 35 with teeth 36 adapted to engage the reverse teeth 27 of the shifter 25. The idler 35 is bushed for rotation on the sleeve 33 and is also shiftable longitudinally thereof. On the sleeve 33, I provide clutch teeth 38 and there are cooperating clutch teeth 39 on the idler 35. The teeth 38 and 39 are adapted to engage when the idler 35 is shifted to a position such that its teeth 37 engage the teeth 27 on the shifter 25.

To drive the transmission in first speed, the shifter 25 is shifted to engage the clutch teeth 21 with the clutch teeth 26, so that the drive is through gears 5, 15, 30 and 18. For the second speed, the shifter 25 is shifted so that clutch teeth 20 and 26 engage. The drive is then through gears 5, 15, 29 and 17. For the next speed, the shifter 22 is shifted so that clutch teeth 19 and 24 engage. The drive is then through gears 5, 15, 28 and 16. For a direct drive, the shifter 22 is shifted so that clutch teeth 6 and 23 engage.

In reverse, the shifter 25 remains in the neutral position illustrated in Fig. 1. The idler 35 is shifted to the left as shown in Fig. 2. The clutch teeth 38 and 39 engage after the teeth 27 and 37 engage. The drive is thus through gears 5, 15, 31, 32, 35 and 27.

An additional speed may be provided with gears 40 and 41 on the main shaft 8 and the countershaft 12 respectively. The gear 41 is bushed and provided with clutch teeth 42 engaging the clutch teeth 43 on a shifter 44.

With my improved transmission, it is possible to have all of the forward speeds constant mesh. The transmission is compact, thus eliminating deflection. The reverse ratios are independent of the ratios of the forward speeds and the shift from neutral to reverse is accomplished by shifting the idler 35 through a single gear width only, thus giving a short gear shift lever movement for this shift.

The terms and expressions which have been hereinemployed are used as terms of description and not of limitation, and there is no intention, in the use of such terms and expressions, of excluding any equivalents of the features shown and described, or portions thereof, but it is recognized that various modifications are possible within the scope of the invention claimed.

Having thus described my invention, what I claim as new and desire to secure by Letters Patent is:

1. In a change-speed transmission having a main shaft and a countershaft provided with cooperating constant mesh gears for all geared forward speeds and clutch means for selectively engaging said gears, the combination of a reverse idler shaft, a sleeve rotatable thereon, a gear fixed on said sleeve for rotating the same, an independent gear on said countershaft for driving said gear on said sleeve, a reverse idler gear rotatably and slidably mounted on said sleeve, an independent reverse gear non-rotatably mounted on said main shaft and in position to be engaged by said reverse idler, and clutch teeth on said sleeve and on said reverse idler engageable when said reverse idler is engaged with said reverse gear and adapted to be disengaged by sliding the reverse idler gear a distance equal substantially to the width of the reverse gear.

2. In a change-speed transmission having a main shaft and a countershaft with a plurality of pairs of constant mesh gears, said main shaft having a pair of shiftable clutch members for selectively engaging said gears, reverse gear teeth on one of said clutch members, a driving gear on said countershaft opposite the other clutch member on said main shaft, a reverse idler shaft, a sleeve rotatably mounted on said reverse idler shaft, a gear fixed on said sleeve and in mesh with said driving gear of said countershaft, a reverse idler rotatably and shiftably mounted on said sleeve opposite said clutch member having said reverse gear teeth and engageable with said reverse gear teeth, and clutch means on said sleeve and on said idler engageable when said idler is in mesh with said reverse gear teeth and when said clutch member having said reverse gear teeth is in neutral position on said main shaft and adapted to be disengaged by sliding the reverse idler gear a distance equal substantially to the width of the reverse gear teeth.

3. In a change-speed transmission having a main shaft, and a countershaft with a plurality of pairs of constant mesh gears, said main shaft having a shiftable clutch member thereon, a driving gear on said countershaft opposite said clutch member, a reverse idler shaft, a sleeve rotatably mounted thereon, a gear in mesh with said driving gear and fixed to said sleeve, a reverse idler rotatably and shiftably mounted on said sleeve, a reverse gear on said main shaft engageable by said idler, and clutch teeth on said idler and on said sleeve engageable when said idler is in mesh with said reverse gear and adapted to be disengaged by sliding the reverse idler gear a distance equal substantially to the width of the reverse gear.

4. In a change-speed transmission having a main shaft and a countershaft with a plurality of pairs of constant mesh gears, said main shaft having a shiftable clutch member for selectively engaging gears of two of said pairs and having reverse gear teeth thereon, a reverse idler shaft having a reverse idler rotatably and slidably mounted thereon opposite said shiftable member and movable into engagement with said reverse teeth, clutch means on said reverse idler shaft and on said idler engageable when said idler is in mesh with said reverse gear teeth and when said clutch member is in neutral position on said main shaft and adapted to be disengaged by sliding the reverse idler gear a distance equal substantially to the width of the reverse gear teeth, a driving gear on said countershaft, and a driven gear in mesh therewith and fixed on said reverse idler shaft for rotating the same.

5. In a change-speed transmission having a main shaft and a countershaft with pairs of constant mesh gears for all geared forward speeds, said main shaft having a shiftable clutch member for selectively engaging gears of two of said pairs and having reverse gear teeth thereon, a reverse idler shaft having a reverse idler rotatably and slidably mounted thereon opposite said shiftable member and movable into engagement with said reverse teeth, clutch means on said reverse idler shaft and on said idler engageable when said idler is in mesh with said reverse gear teeth and when said clutch member is in neutral position on said main shaft and adapted to be disengaged by sliding the reverse idler gear a distance equal substantially to the width of the reverse gear teeth, a driving gear on said countershaft, and a driven gear in mesh therewith and fixed on said reverse idler shaft for rotating the same.

6. In a change-speed transmission having a main shaft and a countershaft provided with cooperating constant mesh gears for all geared forward speeds and clutch means for selectively engaging said gears, the combination of a reverse idler shaft, a gear fixed on said reverse idler shaft for rotating the same, an independent gear on said countershaft for driving said gear on said reverse idler shaft, a reverse idler gear rotatably and slidably mounted on said reverse idler shaft, an independent reverse gear non-rotatably mounted on said main shaft and in position to be engaged by said reverse idler, and clutch teeth on said reverse idler shaft and on said reverse idler engageable when said reverse idler is engaged with said reverse gear and adapted to be disengaged by sliding the reverse idler gear a distance equal substantially to the width of the reverse gear.

7. In a change-speed transmission having a main shaft and a countershaft with a plurality of pairs of constant mesh gears, said main shaft having a pair of shiftable clutch members for selectively engaging said gears, reverse gear teeth on one of said clutch members, a driving gear on said countershaft opposite the other clutch member on said main shaft, a reverse idler shaft, a gear fixed on said reverse idler shaft and in mesh with said driving gear of said countershaft, a reverse idler rotatably and shiftably mounted on said reverse idler shaft opposite said clutch member having said reverse gear teeth and engageable with said reverse gear teeth, and clutch means on said reverse idler shaft and on said idler engageable when said idler is in mesh with said reverse gear teeth and when said clutch member having said reverse gear teeth is in neutral position on said main shaft and adapted to be disengaged by sliding the reverse idler gear a distance equal substantially to the width of the reverse gear teeth.

8. In a change-speed transmission having a main shaft, and a countershaft with a plurality of pairs of constant mesh gears, said main shaft having a shiftable clutch member thereon, a driving gear on said countershaft opposite said clutch member, a reverse idler shaft, a gear in mesh with said driving gear and fixed to said reverse idler shaft, a reverse idler rotatably and shiftably mounted on said reverse idler shaft, a reverse gear on said main shaft engageable by said idler, and clutch teeth on said idler and on said reverse idler shaft engageable when said idler is in mesh with said reverse gear and adapted to be disengaged by sliding the reverse idler gear a distance equal substantially to the width of the reverse gear.

THOMAS BACKUS.